FIG. I

INVENTORS
THOMAS HUTSON, JR.
R.E. RITTER
BY

ATTORNEYS

United States Patent Office 3,646,239
Patented Feb. 29, 1972

3,646,239
ENZYMATIC TREATMENT OF HYDROCARBON DEHYDROGENATION EFFLUENT
Thomas Hutson, Jr., and Ronald E. Riter, Bartlesville, Okla., assignors to Phillips Petroleum Company
Continuation-in-part of abandoned application Ser. No. 751,833, Aug. 12, 1968. This application June 3, 1969, Ser. No. 830,083
Int. Cl. C07c 5/18
U.S. Cl. 260—680 E
4 Claims

ABSTRACT OF THE DISCLOSURE

Excess purge water containing oxygenated hydrocarbons resulting from hydrocarbon dehydrogenation processes is rendered nontoxic by the conversion of the oxygenated hydrocarbons to water and carbon oxides in the presence of microorganisms, e.g., saprophytic bacteria, protozoa, yeast and fungi, under aerobic conditions. In preferred embodiments of the invention, the purge water prior to treatment with microorganisms is reboiled or stripped with a hot gas to reduce the concentration of oxygenated hydrocarbons.

RELATION TO OTHER INVENTIONS

Figure 1:
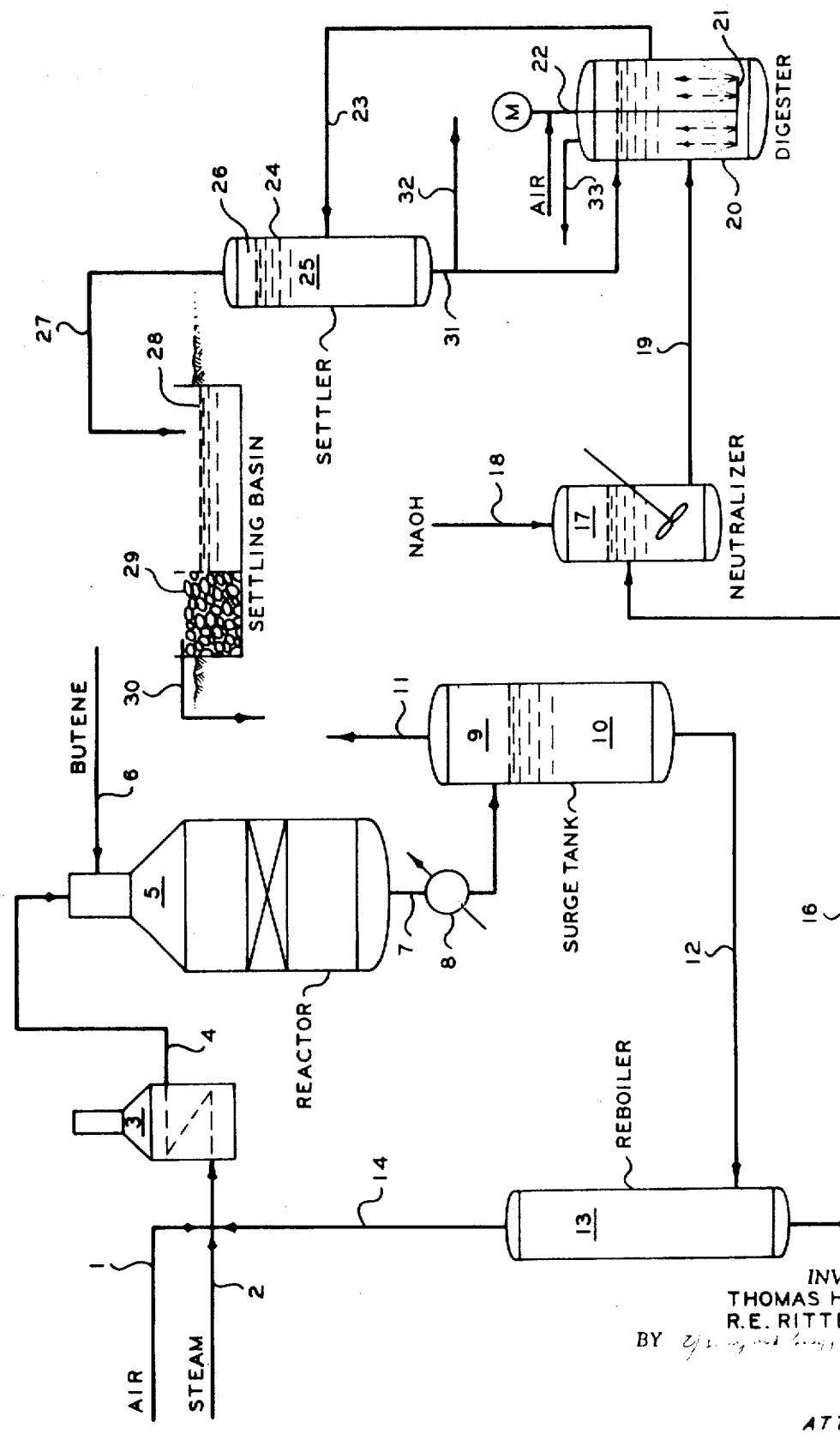

This application is a continuation-in-part application of copending application having Ser. No. 751,833, filed Aug. 12, 1968 and now abandoned.

BACKGROUND OF THE INVENTION

This invention relates to the treatment of water containing oxygenated hydrocarbons. In accordance with another aspect, this invention relates to the treatment of a purge water stream containing oxygenated hydrocarbons resulting from hydrocarbon dehydrogenation processes by reboiling the water prior to treatment with a microorganism so as to be able to dispose of the water. In accordance with another aspect, this invention relates to treatment of a water stream containing oxygenated hydrocarbons resulting from hydrocarbon dehydrogenation processes whereby the water is stripped with a hot gas, such as a combustion gas, prior to treatment of the water with a microorganism for disposal of the water. In accordance with a further aspect, this invention relates to the purification of the water effluent from an oxidative dehydrogenation process whereby the water stream which contains oxygenated hydrocarbons is reduced in concentration of the oxygenated hydrocarbons by stripping these materials from the water stream with a hot gas, preferably a hot absorber vent gas which has been heated by burning with natural gas and air or other combustible materials.

It is conventional in the petroleum industry to catalytically dehydrogenate n-butane over a catalyst such as chromium oxide deposited on an alumina base or carrier to produce an effluent comprising butenes and butadiene. The resulting effluent with or without intermediate separation steps is then subjected to further dehydrogenation in contact with a butene dehydrogenation catalyst to convert the butenes to butadiene, the latter being separated as a product.

A conventional catalyst for butene dehydrogenation comprises iron oxide, chromium oxide, and an alkali metal carbonate, such as potassium carbonate. Operation with this catalyst in the presence of relatively large concentrations of steam promotes the water-gas reaction and maintains the catalyst substantially free of carbonaceous deposits as long as there is an effective concentration of the carbonate present in the catalyst. This oxidation reaction also produces small concentrations of oxygenated hydrocarbons which may leave the process in the hydrocarbon effluent and/or in the separated steam condensate.

In a more recently developed butene dehydrogenation process known as oxidative dehydrogenation, an oxygen-containing gas is fed to the catalytic reaction zone containing a catalyst such as stannic phosphate along with the butenes feed and steam, and a substantial portion of the hydrogen produced by dehydrogenation is combusted to water vapor. This not only removes the inhibiting effect of the hydrogen on further dehydrogenation, but also supplies heat to this endothermic reaction resulting in high conversions and per-pass yields of butadiene at relatively good selectivity. By this method, additional steam is produced which is recovered from the process effluent as condensate. Also, moderate concentrations of oxygenated hydrocarbons are generated which similarly appear in the condensed steam and/or in the hydrocarbon effluent.

We have found that as much as 4 mol percent of the olefin feed may be converted to oxygenated hydrocarbons such as carboxylic acids, aldehydes, ketones, etc., especially acetic and propionic acids and acetaldehyde; the nature and quantity of these compounds depending on the conditions under which dehydrogenation is effected. Under normal plant operating conditions, these oxygenated by-products will be ultimately vented to the atmosphere and/or discharged with waste water from the process, depending upon the separation and recovery processes employed and their operating conditions. However, it has been found that these by-products are toxic and result in damage to property, particularly crops and foliage and are probable contributors to photochemical smog and haze, especially when vented as aerosols. It is not only desirable to eliminate or at least reduce this source of air and water pollution, but such control is essential in many locations.

The practice of this invention is helpful in this regard by virtue of the fact that oxygenated hydrocarbons produced during the dehydrogenation are accumulated and converted to nontoxic materials, e.g., water and oxides of carbon, by contacting the same with oxygenated hydrocarbon active microorganisms. This invention provides further advantages in that the makeup water and/or steam requirement for this process is eliminated due to the fact that the water vapor formed by the oxidative dehydrogenation reaction as well as the steam initially fed to the reactor, both contained in the reactor effluent, can be condensed, accumulated, and recycled.

It is, therefore, one object of this invention to provide an improved process for the oxidative dehydrogenation of hydrocarbons. It is another object of this invention to provide a process for the elimination of oxygenated hydrocarbons from dehydrogenation effluents. It is yet another object of this invention to provide an oxidative dehydrogenation process wherein water diluent requirements and oxygenated hydrocarbon emissions are reduced.

SUMMARY OF THE INVENTION

In accordance with said copending application, excess purge water containing oxygenated hydrocarbons resulting from hydrocarbon dehydrogenation processes is rendered nontoxic by the conversion of the oxygenated hydrocarbons to water and carbon oxides in the presence of microorganisms, e.g., saprophytic bacteria, protozoa, yeast and fungi, under aerobic conditions.

In accordance with a preferred embodiment of said copending application, purge water containing oxygenated hydrocarbons resulting from hydrocarbon dehydrogenation processes is reboiled to volatilize the liquid-water phase to remove a steam phase which is returned to the dehydrogenation reactor and a liquid phase increased in concentration of oxygenated hydrocarbons.

In accordance with the present invention, it has been found that the concetration of oxygenated hydrocarbons in the liquid phase passed to the microorganism treatment can be reduced by stripping oxygenated hydrocarbons from the purge water with a hot gas.

Thus, in accordance with one embodiment of the present invention, waste water from an oxidative dehydrogenation process is stripped with hot gas to reduce the organic content. The water can then be fed to a digester at a considerable savings in dilution water which is normally required before the water can be purified in a bio digester. It has been found in the present practice that the organic concentration of the waste water requires about a tenfold dilution to render the water palatable for the digester microorganisms. According to the present invention, this dilution requirement would be significantly reduced.

In accordance with another embodiment of this invention, a vent gas obtained from a hydrocarbon absorber comprising nitrogen, a small amount of hydrocarbon and other light gases is heated by burning with natural gas and air and then used as the stripping medium to reduce the oxygenated hydrocarbon content of the water. The stripping gas after contacting the water can be vented for disposal or burned as desired. The advantage for this embodiment is the reduction in air pollutants being vented to the atmosphere. By this embodiment, an inexpensive source of stripping gas is provided and at the same time a substantial reduction in air pollutants being vented is also realized.

DESCRIPTION OF THE PREFERRED EMBODIMENTS

Hydrocarbon dehydrogenation process effluents are rendered nontoxic by the elimination of oxygenated hydrocarbons produced during such dehydrogenation by contacting an aqueous mixture of the oxygenated hydrocarbons, e.g., ketones, aldehydes, acids, etc., with oxygenated hydrocarbon active microorganisms under conditions sufficient to convert the oxygenated hydrocarbons to nontoxic materials. This function is accomplished primarily by microbial degradation of the oxygenated hydrocarbons to water and carbon oxides.

In a presently preferred embodiment, hydrocarbons are dehydrogenated in the presence of water, in the form of steam, and oxygen with the result that a minor amount of hydrocarbon feed is converted to oxygenated derivatives thereof to produce an effluent comprising reactant hydrocarbons, dehydrogenated hydrocarbons, oxygenated hydrocarbons and water, the reactant hydrocarbons and dehydrogenated hydrocarbons are separated from the remainder of the mixture, i.e., water and oxygenated hydrocarbons, by selective condensation of the water and oxygenated hydrocarbons. This condensate is then concentrated in oxygenated hydrocarbons by selectively vaporizing water to produce a vapor phase having a substantially reduced concentration of oxygenated hydrocarbons and a liquid phase having a relatively increased concentration of the toxic materials. This liquid phase is then subjected to microbial degradation to nontoxic materials, e.g., water and oxides of carbon, in the presence of oxygenated hydrocarbon active microorganisms. Such microorganisms are generally well known and have found wide application in sewage disposal facilities. Active growths effective for this purpose can comprise saprophytic bacteria, protozoa, yeast and fungi.

Figure 2:
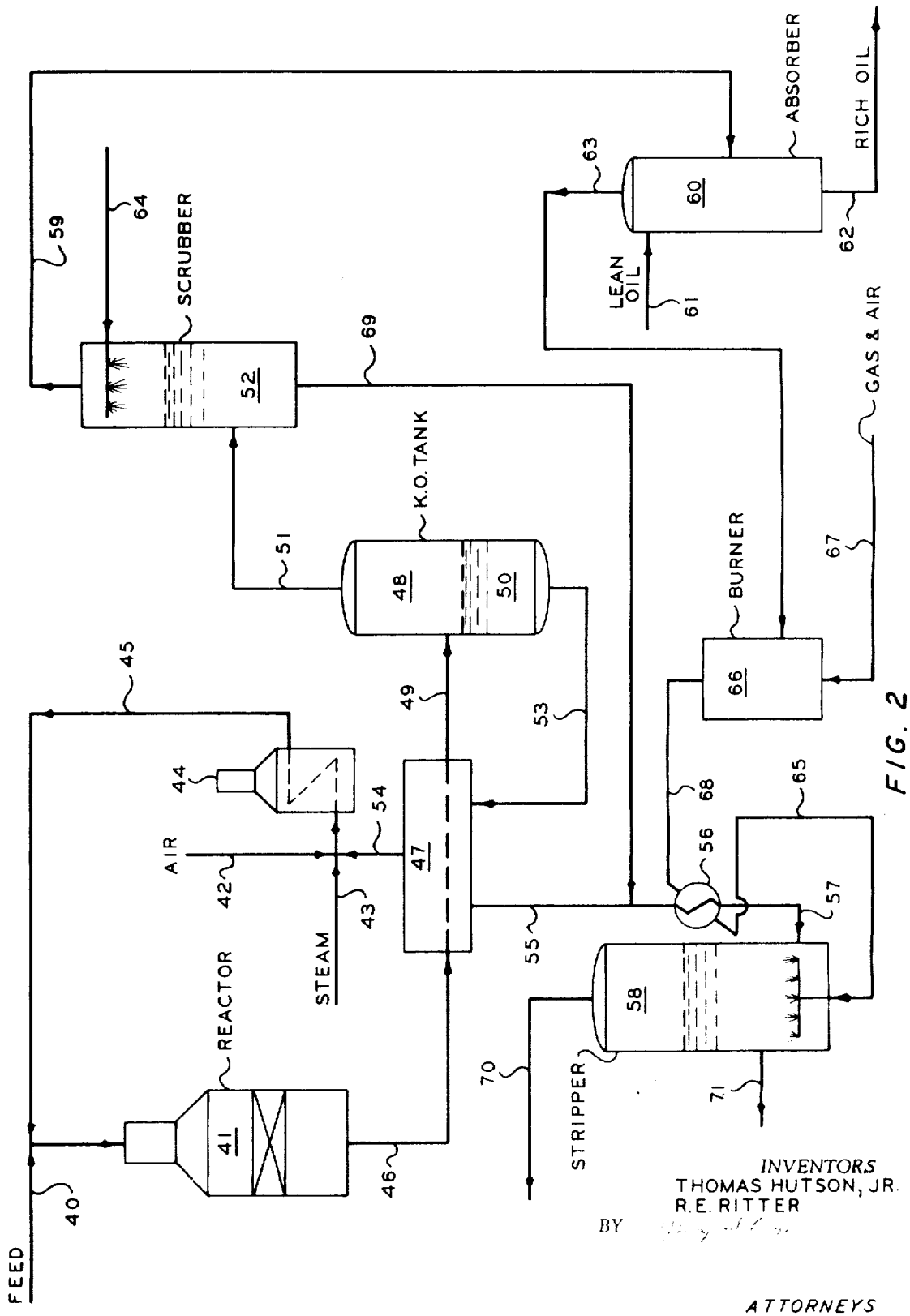

A better understanding of the invention will be obtained upon reference to the accompanying drawings wherein:

FIG. 1 is a schematic flow for an oxidative dehydrogenation process wherein the effluent from the reactor is separated into a vapor phase and a liquid phase, the liquid phase comprising water and oxygenated hydrocarbons which is reboiled, vapor being returned to the reactor and the liquid phase removed from the reboiling is passed to a bio digester, and FIG. 2 is another embodiment for treating the effluent from an oxidative dehydrogenation process wherein the water phase containing oxygenated hydrocarbons is stripped by contacting with a hot gas such as a combustion gas obtained upon burning vent gases from a hydrocarbon absorption unit.

The method of this invention will be illustrated by more detailed description of a preferred embodiment which is illustrated in FIG. 1. This drawing illustrates an oxidative dehydrogenation system wherein air and steam are passed to furnace 3 by way of process lines 1 and 2, respectively, and are heated to reaction temperature of 1050° F. After this, the conditionally combined stream is passed by way of pipe 4 to reactor 5 wherein it is admixed with butene introduced by way of pipe 6. The resultant mixture contacts a suitable dehydrogenation catalyst as already discussed at a reaction temperature such as from about 800 to about 1000° F. whereby the butene is converted at least partially to butadiene, oxygen and hydrocarbons and water. Conversions to butadiene at holding times of about 0.1 to 1 second are about 70 percent based on hydrocarbon feed. Production of oxygenated hydrocarbons, e.g., $C_1$–$C_4$, ketones, aldehydes, carboxylic acids, etc., ranges from 1 to about 4 weight percent based on feed hydrocarbon. Water production rate depends primarily on the combination of two factors, the combination of feed and oxygen with hydrogen abstracted from the butene feed and oxidation of the feed hydrocarbon. This rate of water production is about 125 pounds per hour (approximately 1 mole per mole of butene converted) where the butane and steam feed rates are about 560 and about 5000 pounds per hour, respectively.

The reactant effluent comprising unreacted hydrocarbons, dehydrogenated butene, e.g., butadiene, oxygenated hydrocarbons, water and carbon oxides resulting from the oxidation of butene feed is removed from the reactor by way of pipe 7 and passed through condenser 8 wherein the water is substantially condensed to produce an aqueous phase containing a predominance of the oxygenated hydrocarbons contained in the reactor effluent. This condensate is passed to collection vessel 9 wherein the aqueous phase 10 containing oxygenated hydrocarbons is accumulated and the vaporous hydrocarbon phase is removed by way of pipe 11 and passed to purification and collection facilities.

Recycle of the condensate phase containing oxygenated hydrocarbons to the dehydrogenation zone to meet reaction demand is, of course, desirable for economic reasons. However, assuming no loss of water in the system an amount of water equivalent to that produced in the dehydrogenation zone must be discarded or accumulated in excess storage. In addition, it is preferable to prevent complete vaporization of the recycle aqueous phase in the reboiler since the nonvolatile oxygenated compounds and polymers of oxygenated compounds are left behind on the exchanger tubes, thus fouling and ultimately plugging said tubes. Also, it has been found that the exchanger tubes must be submerged in the aqueous phase at all times since nonvolatile oxygenated compounds precipitate out at the vapor-liquid interface. Hence, any tubes exposed above the liquid level will become fouled and will ultimately plug with solids consisting mainly of polymerized oxygenated compounds.

Problems are avoided by the method of this invention which provides that the aqueous condensate 10 is passed by way of pipe 12 to reboiler 13 wherein an amount of water equivalent to the process demand rate is vaporized and returned to furnace 3 by way of pipes 14 and 2. The excess aqueous phase approximately equivalent to the water of reaction produced in the dehydrogenation zone which is concentrated in nonvolatile oxygenated hydrocarbon impurities is passed to digester 20 by way of pipe 16, neutralizer 17, and pipe 19 wherein the neutralized phase at a pH of about 7 is intimately contacted under aerobic conditions with microorganisms capable of digesting oxygenated hydrocarbons to produce nontoxic residuum or products. Microorganisms which have been found to grow rapidly on this aqueous mixture of oxygenated hydrocarbons are, for example, saprophytic bacteria, yeast and fungi. NaOH, $Na_2CO_3$, plant boiler blowdown water, etc., can be fed either separately or in combination to neutralizer 17 via pipe 18.

Standing time in digester 20 should be from about 4 hours to about 2 days during which time the mixture of microorganisms, water and oxygenated hydrocarbons are intimately admixed and contacted with air injected into the mixture by suitable distribution manifold 21. The duration of contacting required to accomplish a predetermined degree of conversion of oxygenated hydrocarbons to nontoxic products, e.g., carbon dioxide, carbon monoxide, and water, is, of course, a function of those parameters which influence the rate at which the microorganisms consume the oxygenated hydrocarbons such as the relative concentrations of microorganisms, oxygenated hydrocarbon, and oxygen and the temperature at which the aqueous dispersion is maintained. All of these conditions can be varied considerably although the complete conversion of oxygenated hydrocarbons is promoted where the rate of conversion is not limited by oxygen concentration per se. As a result, it is generally preferable to assure that oxygen concentration in the digestion zone is sufficient to satisfy the maximum demand rate of the microorganisms.

The resultant mixture of insoluble growth product, water and conversion products is passed by way of pipe 23 to settler 24 wherein the growth product which settles as a sludge is allowed to accumulate in a more dense phase 25. A portion of this active sludge is recycled by way of pipe 31 to digester 20. Excess growth product which forms as a result of the continuous growth of the microorganisms is discarded as required by way of pipe 32. The purified aqueous phase 26 containing some sludge is passed by way of pipe 27 to settling basin 28 wherein further precipitation of the microorganisms and heavy residuum results. After a settling period sufficient to allow substantially complete separation of water and residual insoluble matter, e.g., from about 7 to about 10 days, the water can be passed through filtering means 29 and discarded by way of pipe 30 without fear of pollution. Gaseous products producing as a result of the microbial degradation, e.g., carbon dioxide, carbon monoxide, etc., are vented from the digestion zone 20 along with excess air via vent 33 during the decomposition step.

Referring now to FIG. 2, a hydrocarbon feed steam comprised principally of butene is passed by way of line 40 to oxidative dehydrogenation reactor 41. Air and steam are passed by way of lines 42 and 43, respectively, to furnace 44 wherein these are heated to a reaction temperature of approximately 1015° F. The effluent is removed from furnace 44 by way of line 45 and combined with the hydrocarbon feed in line 40 and introduced into oxidative dehydrogenation reactor 41. Reactor 41 is operated under substantially the same conditions as defined with respect to the reactor in FIG. 1. Similarly, the same reaction catalyst and other conditions can be employed.

The oxidative dehydrogenation reaction effluent comprising unreacted hydrocarbons, dehydrogenated butene, e.g., butadiene, oxygenated hydrocarbons, water and carbon oxides resulting from the oxidation of butene feed is removed from the reactor by way of line 46 and passed to condenser heat exchanger 47 wherein the water is substantially condensed to produce an aqueous phase containing a predominance of the oxygenated hydrocarbons contained in the reactor effluent. This condensate is passed to collection vessel 48 by way of line 49 wherein the aqueous phase 50 containing oxygenated hydrocarbons is accumulated and the vaporous hydrocarbon phase is removed by way of line 51 and passed to effluent scrubber 52.

The liquid phase 50 is removed from vessel 48 by way of line 53 and passed to reboiler exchanger 47 wherein a portion of water phase is vaporized and passed by way of line 54 to furnace 44. This vaporized portion passed by way of 54 is combined with the fresh steam in line 43 and air in line 42 and heated in furnace 44 as described previously.

The remainder of the aqueous phase containing oxygenated hydrocarbons passed by way of line 53 to reboiler exchanger 47 which is not vaporized is passed by way of line 55 through heater 56 and line 57 and introduced into waste water stripper 58, the operation of which is to be described hereinbelow.

The vaporous hydrocarbon phase passed by way of line 51 to effluent scrubber 52 is passed upwardly through scrubber 52 countercurrent to a boiler blowdown stream introduced near the top of scrubber 52 at 64. The boiler blowdown stream is comprised principally of water with small concentrations of carbonates, bicarbonates, hydroxides, sulfates and sulfites giving a pH of 10 to 12. Scrubber 52 can comprise packing trays, etc. The conditions of temperature, pressure, etc. employed in scrubber 52 are as follows: 70° F., 35 p.s.i.a. 3000 to 10,000 s.c.f.h. vapor per gallon of blowdown. A vaporous phase comprising hydrocarbon, $CO_2$, nitrogen, oxygen and CO is removed overhead from scrubber 52 by way of line 59 and passed to hydrocarbon absorption column 60.

In column 60 the vaporous phase removed from scrubber 52 is contacted with a hydrocarbon absorption oil introduced into the upper portion of column 60 by line 61 and removed from the bottom of column 60 by way of line 62. The absorption oil contains hydrocarbon present in the feed passed to column 60. An overhead stream is removed from column 60 comprising light hydrocarbons, CO, $CO_2$, nitrogen and oxygen by way of line 63, and is passed to burner 66 wherein gas such as natural gas and air are introduced by way of line 67 to heat the absorption column vent stream introduced therein by way of line 63. The natural gas and air or other oxygen-containing gas are burned in burner 66 heating the absorber vent gas introduced by way of line 63 and at the same time oxidizing its hydrocarbon content. The hot gases removed from burner 66 by way of line 68 are passed in heat exchange relationship with water in lines 55 and 57 in exchanger 56 and then to waste water stripper 58.

A water stream containing oxygenated hydrocarbons is removed from the base of scrubber 52 by way of line 69 and introduced into line 55, passed through heater 56 and line 57 and introduced into waste water stripper 58.

Waste water stripper 58 can be provided with a sparger or other means near its base for introduction of the hot gases introduced by way of line 65 for maximum contact with water in the stripper. The stripping gases pass upwardly through the water and are exhausted from the stripper by way of line 70 for further disposal as desired.

The aqueous phase present in stripper 58 substantially reduced in oxygenated hydrocarbon content is removed therefrom by way of line 71 and passed to a bio digester system including a neutralizer, digester, settler, etc. as described in connection with FIG. 1.

The ratio of water to stripping gas employed in waste water stripper 58 is dependent upon the quantity of water to be stripped. However, ordinarily the range will be from 3–12:1 water to gas ratio by weight. In a presently preferred embodiment, a 7:1 water to gas weight ratio is preferred. The holdup time in the water stripper is varied from a few minutes to several hours, say, 30 minutes to 4 to 5 hours. Ordinarily, it is preferred to maintain the water in the stripping zone for approximately 2 hours. The time of contacting, of course, will be dependent upon the effectiveness of the contacting, the type of apparatus employed, etc.

The temperature of the stripping gas is ordinarily in the range of 150° to 500° F. Presently it is preferred to employ a temperature of about 250° F.

The stripping gases that can be employed can be any gas under the proper conditions of temperature, etc. which will collectively strip the oxygenated hydrocarbons from the water. Inert gases such as nitrogen, carbon dioxide, carbon monoxide, etc. can be employed; however, we prefer to use the hot asborber vent gas for reasons of economy which is heated by burning with natural gas and air.

The present invention of stripping the waste water with gas from the reactor effluent absorber before bio digestion accomplishes two objectives, namely, (1) the need for dilution water is virtually eliminated, significantly reducing equipment size and water requirement, and (2) the organic content of the absorber overhead is burned, thereby reducing the quantity of air pollutants vented to the atmosphere. Another advantage is that by the removal of a substantial portion of the oxygenated organic impurities prior to bio digestion the microbial action of the digester is significantly improved. Additionally, the system defined by FIG. 2 is pretty much self-contained wherein essentially all of the impurities are removed such as from the reactor product, scrubber blowdown, reboiler blowdown and separator drain. The stripping gases are produced in the system from an oil absorption unit. Additionally, boiler blowdown water is used as an initial scrubbing medium for the hydrocarbon vapor recovered from the oxidative dehydrogenation process.

The combustion gases containing oxygenated hydrocarobns removed from the waste water stripper can be discharged to the atmosphere or through a flare which will prevent air pollution and the stripped water, after microbiol digestion, can be discharged to streams, etc. without fear of pollution.

In carrying out an embodiment of the invention according to FIG. 2, it has been found that a significant amount of the oxygenated organics can be stripped from the water by bubbling it with hot gas. In one test in which process condensate at 205° F. was stripped with air for two hours resulted in a 64 percent reduction in the carbon content of the water. This reduction alone is not sufficient to render the water clean enough for direct disposal, but does provide a better water stream for further purification in a bio digester.

In another embodiment according to FIG. 2, the operating conditions listed in Table I will be found to exist.

TABLE I

| Stream No. | Flow rate, pounds/hour | Temperature, °F. | Constitution of stream |
|---|---|---|---|
| 40 | 51,000 | 900 | 90% butenes. |
| 42 | 94,600 | | Air. |
| 53 | 459,000 | 100 | Water. |
| 43 | 190,000 | | Fresh steam. |
| 55 | 222,500 | 100 | Blowdown water. |
| 51 | 138,800 | 100 | Hydrocarbons, CO$_2$, CO, N$_2$, O$_2$. |
| 69 | 149,300 | | Water. |
| 59 | 136,300 | 80 | Hydrocarbons, CO$_2$, CO, N$_2$, O$_2$. |
| 61 | 1,542,000 | | Absorption oil (lean). |
| 62 | 1,590,800 | | Absorption oil and product hydrocarbons. |
| 63 | 87,500 | 130 | Light hydrocarbons, CO$_2$, CO, N$_2$, O$_2$. |
| 67 | 1,265 | | Fuel gas. |
| 67 | 17,300 | | Air. |
| 68 | 106,065 | 1,500 | Combustion gases. |
| 65 | 106,065 | 250 | Do. |
| 57 | 371,800 | 200 | Contaminated water. |
| 70 | 197,800 | | Water vapor and gaseous contaminants. |
| 71 | 280,000 | | Water. |

In Table II are given in more detail the constitution of certain gas streams, obtained by chromatographic analyses on a water-free basic.

TABLE II.—ANALYSES OF GAS STREAMS
[mol percent]

| | Stream Number | | |
|---|---|---|---|
| | 59 | 63 | 51 |
| O$_2$ | 5.57 | 7.48 | 5.57 |
| N$_2$ | 67.00 | 82.66 | 67.00 |
| Methane | 0.29 | 1.29 | 0.29 |
| CO | 1.95 | 6.16 | 1.95 |
| Ethane plus ethylene | 0.36 | 0.68 | 0.36 |
| CO$_2$ | 1.29 | 1.35 | 1.29 |
| Propane | 0.03 | 0.15 | 0.03 |
| Propylene | 0.55 | 0.10 | 0.55 |
| iso-Butane | 0.03 | 0.01 | 0.03 |
| n-Butane | 2.49 | 0.03 | 2.49 |
| neo-Pentane | 0.43 | | 0.43 |
| Isobutylene | 0.04 | | 0.04 |
| Butene-1 | 0.65 | 0.02 | 0.65 |
| t-Butene-2 | 3.89 | 0.03 | 3.89 |
| c-Butene-2 | 2.48 | 0.02 | 2.48 |
| Butadiene | 12.96 | 0.02 | 12.96 |
| Acetaldehyde, p.p.m | 870 | | 2,600 |

In Table III is given the characteristics of certain of the water streams.

TABLE III.—CHARACTERISTICS OF WATER STREAMS

| | Stream number | | | | |
|---|---|---|---|---|---|
| | 55 | 69 | 57 | 71 | 64 |
| Carbonyls, p.p.m | 1,746 | 9,800 | 5,000 | 500 | 0 |
| pH | 3.2 | 5.3 | | | 11.2 |
| Carbon content, wt. percent | 0.08 | 0.30 | 0.18 | 0.018 | |

The carbon content of certain of the streams is shown in Table IV.

TABLE IV

| Stream No.: | Carbon content (lbs. per hour) |
|---|---|
| 55 | 170 |
| 69 | 500 |
| 57 | 670 |
| 71 | 67 |

Stream 70 consists of N$_2$, CO$_2$, CO and about 603 pounds per hour of organically combined carbon, mainly as carbonyls and organic acids.

It will readily be seen that our process removes approximately 90 percent of the harmful contaminants from the process water, making it possible to further treat this water by bio digestion, and discard without fear of stream pollution. The gaseous discharge at 70 can readily be burned in flares, etc., reducing air pollution to that normally obtained with furnace combustion products.

We claim:

1. In a hydrocarbon oxidative dehydrogenation process wherein olefin hydrocarbon is partially converted to oxygenated hydrocarbons and an effluent mixture is produced from said process comprising water, unreacted reactant hydrocarbon, dehydrogenated reactant hydrocarbon, and said oxygenated hydrocarbons, and further wherein said unreacted reactant hydrocarbon and said dehydrogenated hydrocarbon are separated from said effluent mixture as a vapor after having cooled said effluent mixture to condense an aqueous phase containing said oxygenated hydrocarbons from said effluent mixture, the improvement comprising:

(a) at least partially vaporizing said aqueous phase of water and oxygenated hydrocarbons to produce (1) a vapor aqueous phase having a substantially reduced concentration of said oxygenated hydrocarbons and returning said vapor aqueous phase to said process and (2) a concentrated aqueous liquid phase;

(b) countercurrently contacting said unreacted reactant hydrocarbon and said dehydrogenated hydrocarbon in a scrubbing zone with an aqueous liquid to remove any remaining oxygenated hydrocarbons therefrom to yield (1) a vaporous overhead comprising unreacted reactant hydrocarbon, dehydrogenated hydrocarbon, CO, CO$_2$, N$_2$, and O$_2$ and (2) an oxygenated hydrocarbon enriched aqueous liquid phase;

(c) contacting said vaporous overhead of step (b) with an oil absorption medium to separate hydrocarbons comprising unreacted reactant hydrocarbon and dehydrogenated reactant hydrocarbon therefrom and leaving a light vaporous phase comprising light hydrocarbons, CO, $CO_2$, $N_2$, and $O_2$;

(d) combusting said light vaporous phase recovered from step (c) to produce a hot combustion gas product;

(e) combining said concentrated aqueous liquid phase obtained from step (a) with said enriched aqueous liquid phase obtained from step (b) and contacting the combined aqueous liquid stream with said hot combustion gas product obtained from step (d) to remove at least a portion of said oxygenated hydrocarbons from said combined stream for further disposal; and (f) contacting the stripped aqueous liquid phase reduced in oxygenated hydrocarbon content resulting in step (e) under aerobic conditions with oxygenated hydrocarbon active microorganisms to convert same to nontoxic water and carbon oxides.

2. A method according to claim 1 wherein (1) said unreacted reactant hydrocarbon and said dehydrogenated reactant hydrocarbon obtained in step (b) are scrubbed with boiler blowdown water, as the aqueous liquid, which is maintained at a temperature in the range of 50° to 100° F., (2) the combustion gas products produced in step (d) are at a temperature in the range of 150° to 500° F., and (3) the weight ratio of water to stripping gas employed in the stripping of oxygenated hydrocarbons from the combined aqueous liquid stream in step (e) is in the range of 3–1 to 12–1.

3. A process according to claim 1 wherein the amount of water vaporized and returned to the dehydrogenation process in step (a) is equivalent to the process demand rate and the concentrated aqueous liquid phase remaining is approximately equivalent to the water of reaction produced in said dehydrogenation process.

4. In a hydrocarbon oxidative dehydrogenation process wherein olefin hydrocarbon is partially converted to oxygenated hydrocarbons and an effluent mixture is produced from said process comprising water, unreacted reactant hydrocarbon, dehydrogenated reactant hydrocarbon, and said oxygenated hydrocarbons, and further wherein said unreacted reactant hydrocarbon and said dehydrogenated hydrocarbon are separated from said effluent mixture as a vapor after having cooled said effluent mixture to condense an aqueous phase containing said oxygenated hydrocarbons from said effluent mixture, the improvement comprising:

(a) at least partially vaporizing said aqueous phase comprising water and oxygenated hydrocarbons by passing same to a reboiling zone and therein subjecting same to reboiling conditions to produce a vapor aqueous phase having a substantially reduced concentration of said oxygenated hydrocarbons and returning said vapor aqueous phase to said process in an amount of water equivalent to the process demand rate;

(b) producing a concentrated aqueous liquid phase increased in said oxygenated hydrocarbon as a bottoms in said reboiling zone, the amount of said aqueous phase being approximately equivalent to the water of reaction produced in said dehydrogenation process, (c) adjusting the pH of said concentrated aqueous liquid phase by addition of a basic material thereto in an amount sufficient to neutralize said concentrated aqueous liquid phase, and (d) contacting said concentrated aqueous liquid phase containing said oxygenated hydrocarbons, which has been neutralized, under aerobic conditions with oxygenated hydrocarbon active microorganisms to convert same to nontoxic water and carbon oxides.

References Cited

UNITED STATES PATENTS

| | | | |
|---|---|---|---|
| 1,734,011 | 10/1929 | Harrison | 210—15 X |
| 2,945,900 | 7/1960 | Alexander et al. | 260—680 X |
| 2,991,320 | 7/1961 | Hearne et al. | 260—680 |
| 3,161,670 | 12/1964 | Adams et al. | 260—680 X |
| 3,370,103 | 2/1968 | Callahan et al. | 260—680 |
| 3,426,093 | 2/1969 | Karkalits et al. | 260—680 |

PAUL M. COUGHLAN, Jr., Primary Examiner

U.S. Cl. X.R.

210—15; 260—681.5 R